Figure 1:
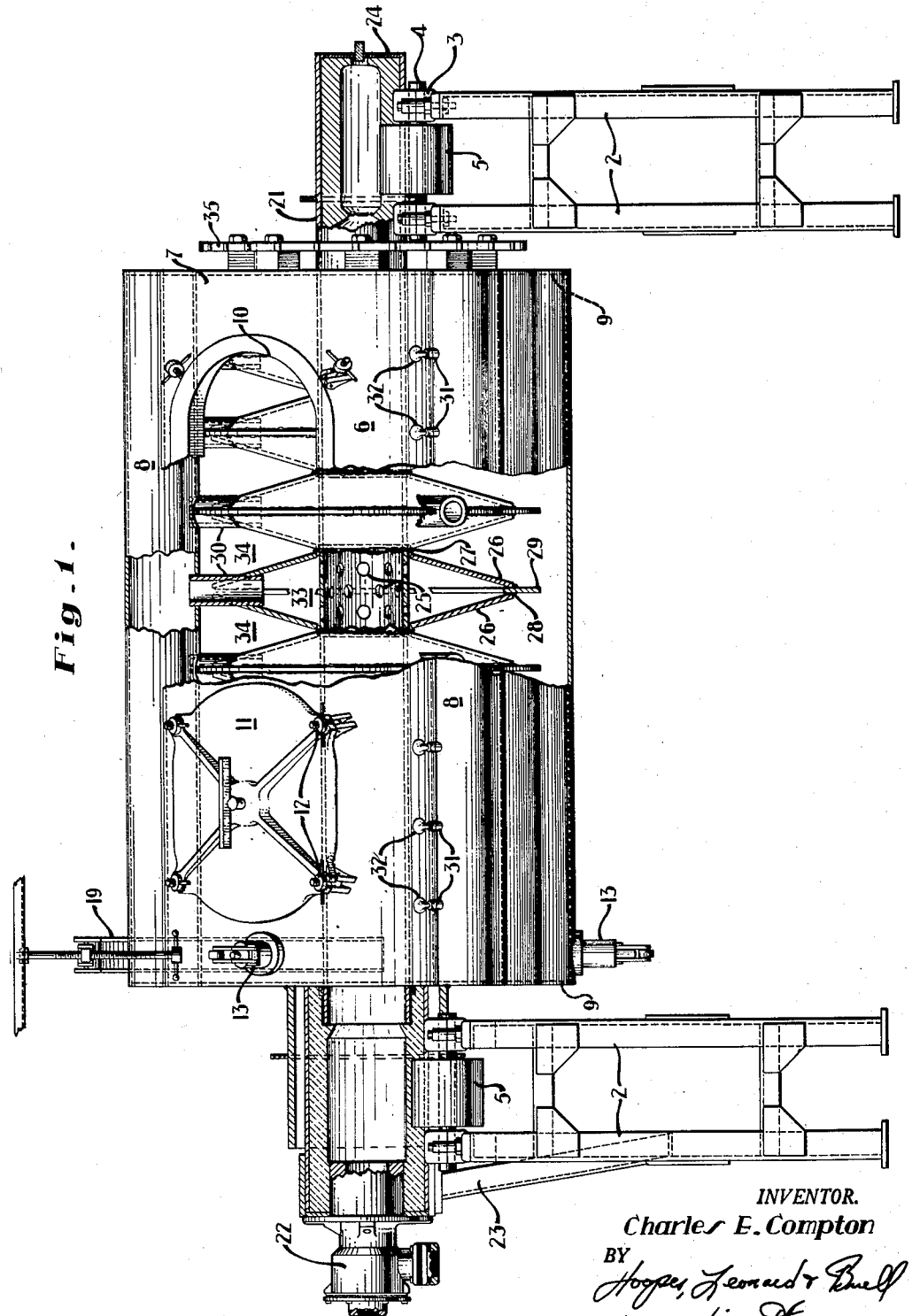

Aug. 19, 1958 — C. E. COMPTON — 2,848,210
DEHYDRATING GYPSUM OR THE LIKE
Filed April 16, 1954 — 2 Sheets-Sheet 2

INVENTOR.
Charles E. Compton

2,848,210

DEHYDRATING GYPSUM OR THE LIKE

Charles E. Compton, Bridgeport, W. Va.

Application April 16, 1954, Serial No. 423,805

1 Claim. (Cl. 263—53)

This invention relates to a method of dehydrating or calcining gypsum or the like and involves certain novel features whereby the dehydrating operation is performed with unprecedented speed and efficiency and a superior product is produced.

It has heretofore been proposed to dehydrate gypsum or the like in a rotating drum by applying the heat to the gypsum or the like within the rotating drum by steam but maintaining the steam for applying heat out of contact with the gypsum or the like. Such a method of dehydration has not proved commercially satisfactory for several reasons. The time required for dehydration has been undesirably long. It has been necessary to provide two separate steam-tight chambers, one for the heating steam and the other for the gypsum or the like which during dehydration gives off steam the pressure of which must be controlled. Such a method is uneconomical when attempted to be practiced on a commercial scale.

It has also been proposed to dehydrate gypsum or the like in a rotating drum by applying the heat to the gypsum or the like within the rotating drum by mounting the drum inside a furnace. That method likewise has been uneconomical, requiring an undesirably long time for accomplishing the dehydration and producing an inferior product.

My improved method includes a number of features overcoming the disadvantages above mentioned, which features may be employed separately or together. Optimum advantage of my invention accrues from utilizing in combination all of the features thereof.

I desirably dehydrate gypsum or the like by agitating a mass of pieces of gypsum or the like, substantially dividing the mass into semi-segregated smaller masses and during the agitating applying heat to the respective smaller masses at opposite sides thereof. While certain of the advantages of my invention are obtainable by the use of a non-rotating dehydrating drum, I prefer to employ a rotating drum in which agitation of the mass of pieces of gypsum or the like is accomplished by tumbling. The agitation may in certain cases be accomplished otherwise. I preferably substantially divide the mass of pieces of gypsum or the like into semi-segregated smaller masses of pieces and during the tumbling apply heat to the respective smaller masses at opposite sides thereof, thereby realizing unprecedentedly uniform application of heat throughout the mass. The dividing of the mass of pieces of gypsum or the like into semi-segregated smaller masses and applying heat to the respective smaller masses at opposite sides thereof greatly increases the heating efficiency and consequently reduces the dehydrating time. In the preferred practice of the invention I substantially divide a mass of pieces of gypsum or the like into semi-segregated smaller generally annular masses and apply heat to the respective smaller generally annular masses at opposite sides thereof. I find it desirable to apply heat to the respective smaller generally annular masses at the inner annular faces and at the opposite side faces thereof.

I find it desirable in dehydrating gypsum or the like to tumble a mass of pieces of gypsum or the like about a generally horizontal passage, substantially divide the mass into semi-segregated smaller generally annular masses in generally side-by-side relationship with the passage extending therethrough and during the tumbling pass a heating medium through the passage and also generally radially outwardly between the annular masses and thereby apply heat to the annular masses at the inner annular faces and at the opposite side faces thereof.

According to another feature of my invention I dehydrate gypsum or the like by disposing a mass of pieces of gypsum or the like in a dehydrating chamber and applying heat to the mass in the dehydrating chamber by conduction from the exterior of the dehydrating chamber by flowing hot products of combustion in a predetermined path against the exterior of the dehydrating chamber. Preferably the hot products of combustion are continuously passed or flowed against the outside of the dehydrating chamber whereby to continuously apply heat to the mass in the dehydrating chamber by conduction from without.

In a preferred method of practicing the invention I tumble a mass of pieces of gypsum or the like about a generally horizontal passage, substantially divide the mass into semi-segregated smaller generally annular masses in generally side-by-side relationship with the passage extending therethrough and during the tumbling pass hot products of combustion through the passage and also generally radially outwardly between the annular masses while maintaining the products of combustion out of direct contact with the gypsum or the like and exhaust the products of combustion, the products of combustion applying heat to the annular masses at the inner annular faces and at the opposite side faces thereof.

Other details, objects and advantages of the invention will become apparent as the following description of a present preferred method of practicing the same proceeds.

Figure 2:
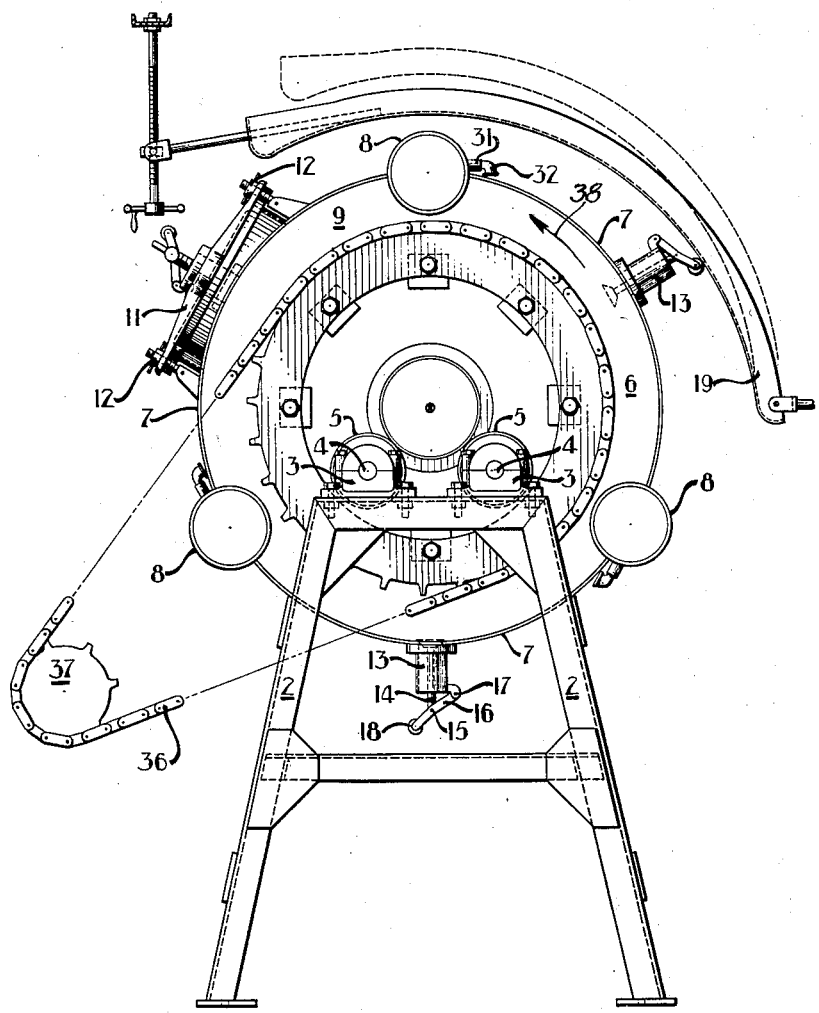

In the accompanying drawings I have illustrated a present preferred method of practicing the invention and have shown one form of apparatus which may be employed, in which:

Figure 1 is a side view of apparatus for dehydrating gypsum or the like with portions cut away and portions in section; and Figure 2 is an end view of the apparatus shown in Figure 1.

Referring now more particularly to the drawings, there are provided two pedestals 2 each carrying bearings 3 rotatably supporting shafts 4 each carrying a supporting roller 5. There are two rollers 5 on each pedestal 2, the rollers of the respective pedestals forming drum supporting crotches which are in line longitudinally of the apparatus.

The dehydrating drum is designated generally by reference numeral 6. It comprises a generally cylindrical shell made up of curved single thickness metal portions 7 and tubes 8, the particular drum 6 shown in the drawing having three portions 7 and three tubes 8. The portions 7 and tubes 8 are connected together to form the generally cylindrical shell, as, for example, by welding. Each of the tubes 8 consequently constitutes a portion of the shell with part of the outside surface of the tube exposed inwardly and part exposed outwardly of the shell. Strengthening plates or struts not shown in the drawings may be provided for adding structural strength to the shell as may be deemed necessary or desirable or dictated by principles of structural design well known to those skilled in the art.

The dehydrating drum 6 has end plates 9 applied to and closing the shell at its ends. The drum has two lateral openings 10 through which a mass of pieces of gypsum or the like may be introduced for dehydrating and through which the dehydrated gypsum or the like may be dumped out at the end of the dehydrating process. Each of the openings 10 is provided with a removable closure member 11 an clamping means 12 of any suitable construction for clamping the closure member to the drum to close the corresponding opening 10. Sealing gaskets may be provided for sealing the closure members 11 about the openings 10 to make the drum steam-tight. The drum is provided with three circumferentially spaced relief valves 13 for relieveing the steam pressure therewithin, each of the valves 13 having a stem 14 pivoted at 15 to a lever 16 pivoted at 17 to the valve casing and carrying a roller 18 adapted upon rotation of the drum 6 to be engaged by a valve operating cam 19 mounted beside the drum as shown for adjustment toward and away from the drum to cause opening of each relief valve to a desired extent and for a desired portion of the angular turning movement of the drum. Such a relief valve arrangement s not new and is not claimed by me as inventive.

A pipe 21 is provided which passes through the drum 6 and is substantially coaxial therewith and projects beyond both ends of the drum. Central openings for receiving the pipe 21 are provided in the end plates 9 of the drum and the end plates are preferably welded to the pipe 21 about those openings. Thus the drum 6 is supported by the pipe 21 through the drum end plates 9. The projecting ends of the pipe 21 seat in the drum supporting crotches formed by the rollers 5 so that the drum may be rotated about the axis of the pipe.

The left-hand end of the pipe 21 viewing Figure 1 is open and means are provided for introducing heating medium thereinto. In the form shown in the drawings I provide a gas burner 22 mounted on a stand 23 carried by the left-hand pedestal 2 viewing Figure 1. The gas burner 22 delivers a blast of hot products of combustion into the pipe 21 from the left-hand end thereof moving toward the right viewing Figure 1. The right-hand end of the pipe 21 is closed by a closure cap 24. Within the drum 6 the pipe 21 is provided with perforations 25. The perforated portion of the pipe 21 preferably extends throughout at least the major portion of the length of the drum. Disposed about the perforated portion of the pipe 21 within the drum 6 is an annular accordion-like structure made up of annular plates 26 welded together at 27 and at 28. Where the plates 26 are joined at 28 an annular plate 29 is welded to them and projects generally radially as shon in Figure 1. Three connecting tubes 30 are in communication with the internal space between each opposed pair of plates 26 and are welded thereto and also communicate with the respective tubes 8 and are welded thereto whereby to form a sealed passage for products of combustion from the interior of the pipe 21, outwardly between plates 26, through the connecting tubes 30 and through the tubes 8. Each tube 8 is provided with a normally open exhaust passage 31 terminating in an elbow 32 so that the products of combustion passing out therethrough are directed against one of the portions 7 of the shell as shown in Figure 2, thereby heating the drum exteriorly. The accordion-like structure made up of the plates 26 and 29 and the connecting tubes 30 may expand and contract relatively to the drum due to temperature changes. The plates 26 of the accordion-like structure form internal pockets 33 which are in communication with the interior of the pipe 21 through the perforations 25 and external pockets 34 in which the gypsum or the like being dehydrated lies. The external pockets 34 substantially divide the mass of pieces of gypsum or the like into semi-segregated smaller masses of pieces to which heat from the products of combustion from the burner 22 is conducted both at the inner annular faces and at the opposite side faces thereof.

A ring gear or sprocket 35 is applied to the righthand end plate 9 of the drum as shown in Figure 1. The drum may be rotated by any suitable driving means acting upon the ring gear or sprocket, such, for example, as a sprocket chain indicated by the chain line 36 in Figure 2 and driven by a sprocket indicated diagrammatically by the circle 37 which may derive its power from any suitable source. The direction of turning of the drum is as indicated by the arrow 38 in Figure 2.

The dehydrating operation is a batch operation. At the beginning of a batch or cycle the drum is empty. It is positioned with the openings 10 upwardly and a mass of pieces of gypsum or the like to be dehydrated is introduced into the drum through the openings 10. The pieces of gypsum or the like may be of varied sizes, normally ranging from pieces having a maximum dimension of an inch or so down to relatively fine particle size. The drum is largely filled with pieces of gypsum or the like so that the mass of pieces of gypsum or the like extends well above the top of the pipe 21 and preferably to at least about the level of the tops of the plates 26. The drum is filled full enough to avoid unnecessary waste space in it during the dehydrating operation but not so full that the pieces of gypsum or the like are packed tightly in the drum. Provision is thus made for substantial relative movement between the pieces of gypsum or the like during rotation of the drum.

After the mass of pieces of gypsum or the like has been introduced into the drum the closure members 11 are applied to and sealed about the openings 10 and the gas burner 22 is set in operation and the rotation of the drum is commenced. The drum may be rotated at various speeds, a speed of about six to twelve revolutions per minute being found satisfactory. As the drum rotates the pieces of gypsum or the like are tumbled therewithin but are substantially divided into semi-segregated masses in the pockets 34. The products of combustion from the burner 22 pass from left to right viewing Figure 1 through the pipe 21 and thence annularly outwardly through the perforations 25, the pockets 33, the connecting tubes 30, the tubes 8 and the exhaust passages 31 to the outside of the drum. Thus the passage for the products of combustion is open and the flow of products of combustion through the apparatus is continuous. The products of combustion heat the pieces of gypsum or the like in the pockets 34 by conduction through the plates 26 at the inner annular faces and at the opposite side faces of the semi-segregated masses of gypsum or the like in those pockets. The arrangement is such that unprecedented thermal efficiency is obtained. At the same time it is unnecessary to provide a steam-tight chamber for the heating medium.

The time of a complete cycle of operations utilizing my method may be of the order of one and one-half to three hours. The actual dehydration of the gypsum or the like may be accomplished in an hour or less. There is a preliminary preheating period before dehydration actually commences and during which free moisture is driven off from the gypsum or the like. The preheating period may range up to thirty to forty-five minutes. Also, after completion of the dehydration of the gypsum or the like there is a final drying period which may range up to an hour. The time required for preheating, dehydration and final drying depends on a number of factors such as the heat input at the burner, the condition, including size and moisture content, of the gypsum or the like, the temperature of the drum, the temperature of the gypsum or the like at the beginning of the operation, etc.

During the preheating period the valves 13 are kept closed. As the free moisture is driven off the pressure in the dehydrating chamber rises to in the neighborhood of 35 pounds per square inch gauge. Toward the end of the preheating period when most of the free moisture has been driven off I find that the pressure in the dehydrating chamber drops somewhat, possibly due to leakage through the valves 13 which during rotation of the drum and the accompanying impacts of the gypsum as it is tumbled may not maintain a perfect seal. After completion of the preheating of the gypsum or the like and at the beginning of the dehydrating period at which time the water of crystallization begins to be driven off the pressure in the dehydrating chamber begins to rise and may rise to a pressure in the neighborhood of 40 pounds per square inch gauge. At this point the cam 19 is adjusted so that the valves 13 open slightly while opposite the cam during each revolution of the drum. This prevents the pressure in the dehydrating chamber from rising further. As the dehydrating progresses the cam 19 is adjusted closer to the drum axis so that the valves 13 open progressively wider until those valves are relatively wide open at the end of the dehydrating period. Consequently, during the later stages of the dehydrating period the pressure in the dehydrating chamber gradually drops to atmospheric pressure. The pressure in the dehydrating chamber remains at atmospheric pressure throughout the final drying period.

I find it desirable to preheat the drum before introducing gypsum or the like to be dehydrated. This is done by starting operation of the burner 22 with the drum empty but rotating. I desirably preheat the drum to a temperature of the order of 300° F. When the relatively cold gypsum or the like is introduced the temperature within the dehydrating chamber may be reduced to a temperature of the order of 220° F. During the preheating period the temperature in the dehydrating chamber rises to about 250° F. The temperature remains at about 250° F. during most of the dehydrating period and drops off somewhat toward the end of the dehydrating period. The temperature may drop to about 200° F. at the end of the dehydrating period or early in the final drying out period. During the final drying out period the temperature may rise to in the neighborhood of 270° F.

The above description of a cycle of operations is given purely by way of example and the various times, pressures and temperatures may be substantially varied due to changes in conditions.

The term "gypsum" as used in the claim comprehends gypsum and other similar dehydratable materials.

The time required for the actual dehydration of the gypsum or the like and also the total time of the cycle of operations are both substantially less than the corresponding times previously deemed necessary. Thus my operation is unprecedentedly efficient. At the same time I produce a superior product. At the conclusion of the cycle the dehydrated gypsum or the like is dumped out of the drum and the cycle is repeated.

The apparatus is claimed in my copending application Serial No. 423,781, filed of even date herewith.

While I have described a present preferred method of practicing the invention and have illustrated one form of apparatus which may be employed in its practice, it is to be distinctly understood that the invention is not limited thereto but may be otherwise variously practiced within the scope of the following claim.

I claim:

A method of treating gypsum in a batch process comprising at least partially dividing a mass of gypsum in a closed chamber into smaller masses confined at their sides by generally upright heating surfaces, causing the gypsum to shift relatively to said surfaces while maintaining the at least partially divided smaller masses confined at their sides by said generally upright heating surfaces by turning the chamber about a generally horizontal axis, preheating the gypsum by conducting heat thereto through said generally upright heating surfaces while the chamber is turning about the generally horizontal axis so that the free moisture driven off from the gypsum builds up steam pressure in the chamber, and subsequently calcining the gypsum by driving off the water of crystallization by conducting heat thereto through said generally upright heating surfaces also while the chamber is turning about the generally horizontal axis and during the calcining venting the chamber to atmosphere to gradually reduce the pressure of the steam in the chamber.

References Cited in the file of this patent

UNITED STATES PATENTS

| | | |
|---|---|---|
| 781,747 | Simonds | Feb. 7, 1905 |
| 1,524,567 | Plews | Jan. 27, 1925 |
| 1,539,649 | Christie | May 26, 1925 |
| 1,571,189 | Dressler | Feb. 2, 1926 |
| 1,602,576 | Gant | Oct. 12, 1926 |
| 1,718,542 | Dobbelstein | June 25, 1929 |

UNITED STATES PATENT OFFICE
CERTIFICATE OF CORRECTION

Patent No. 2,848,210                                                   August 19, 1958

Charles E. Compton

It is hereby certified that error appears in the printed specification of the above numbered patent requiring correction and that the said Letters Patent should read as corrected below.

Column 3, line 20, for "arrangement s not" read -- arrangement is not --; line 49, for "as shon in Figure 1, read -- as shown in Figure 1 --; line 74, for "righthand" read -- right-hand --.

Signed and sealed this 28th day of October 1958.

(SEAL)

Attest:
KARL H. AXLINE
Attesting Officer

ROBERT C. WATSON
Commissioner of Patents